US010817774B2

(12) United States Patent
Li et al.

(10) Patent No.: US 10,817,774 B2
(45) Date of Patent: Oct. 27, 2020

(54) SYSTEMS AND METHODS FOR PROVIDING CONTENT

(71) Applicant: Facebook, Inc., Menlo Park, CA (US)

(72) Inventors: Kai Li, Ovideo, FL (US); Fei Yang, Fremont, CA (US); Balamanohar Paluri, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 892 days.

(21) Appl. No.: 15/396,303

(22) Filed: Dec. 30, 2016

(65) Prior Publication Data

US 2018/0189281 A1    Jul. 5, 2018

(51) Int. Cl.
*G06N 3/04*     (2006.01)
*G06F 16/783*   (2019.01)

(52) U.S. Cl.
CPC ......... *G06N 3/0454* (2013.01); *G06F 16/783* (2019.01)

(58) Field of Classification Search
CPC .............................. G06N 3/0454; G06F 16/783
USPC ........................................................ 707/747
See application file for complete search history.

(56) References Cited

U.S. PATENT DOCUMENTS

| | | | | |
|---|---|---|---|---|
| 9,141,916 | B1 * | 9/2015 | Corrado | G06N 3/0454 |
| 9,424,461 | B1 * | 8/2016 | Yuan | G06K 9/00201 |
| 9,904,866 | B1 * | 2/2018 | Noble | G06K 9/3241 |
| 2011/0213784 | A1 * | 9/2011 | Udupa | G06F 16/30 |
| | | | | 707/747 |
| 2012/0215789 | A1 * | 8/2012 | Ramanathan | G06K 9/4671 |
| | | | | 707/747 |
| 2013/0243341 | A1 * | 9/2013 | Iakovenko | G06K 9/4671 |
| | | | | 382/218 |
| 2015/0100558 | A1 * | 4/2015 | Fan | G06F 16/43 |
| | | | | 707/698 |
| 2015/0242399 | A1 * | 8/2015 | Ramanathan | G06F 16/7847 |
| | | | | 707/723 |
| 2016/0086078 | A1 * | 3/2016 | Ji | G06N 3/0454 |
| | | | | 382/157 |
| 2017/0039211 | A1 * | 2/2017 | Pottinger | G06F 16/152 |
| 2017/0185665 | A1 * | 6/2017 | Gong | G06N 20/00 |
| 2018/0068023 | A1 * | 3/2018 | Douze | G06F 16/9535 |
| 2018/0101742 | A1 * | 4/2018 | Burge | G06K 9/00926 |

OTHER PUBLICATIONS

Dong Z, Jia S, Wu T, Pei M. Face video retrieval via deep learning of binary hash representations. InThirtieth AAAI Conference on Artificial Intelligence Mar. 5, 2016. (Year: 2016).*

(Continued)

*Primary Examiner* — Mohsen Almani
(74) *Attorney, Agent, or Firm* — Sheppard Mullin Richter & Hampton LLP

(57) ABSTRACT

Systems, methods, and non-transitory computer-readable media can receive a first content item having a set of frames. A binary hash code that represents the first content item is generated using at least an aggregation model and an iterative quantization hash model, the binary hash code being determined based at least in part on the set of frames of the first content item. The binary hash code is stored, wherein a similarity between the first content item and a second content item is capable of being measured based at least in part on a comparison of the binary hash code of the first content item and a binary hash code of the second content item.

20 Claims, 8 Drawing Sheets

(56) References Cited

OTHER PUBLICATIONS

Fu H, Kong X, Lu J. Large-scale image retrieval based on boosting iterative quantization hashing with query-adaptive reranking. Neurocomputing. Dec. 25, 2013;122:480-9. (Year: 2013).*
Gu Y, Ma C, Yang J. Supervised recurrent hashing for large scale video retrieval. InProceedings of the 24th ACM international conference on Multimedia Oct. 1, 2016 (pp. 272-276). (Year: 2016).*
Grauman K, Fergus R. Learning binary hash codes for large-scale image search. InMachine learning for computer vision 2013 (pp. 49-87). Springer, Berlin, Heidelberg. (Year: 2013).*
He L, Wang D, Liu Q, Lu W. Fast image quality assessment via supervised iterative quantization method. Neurocomputing. Nov. 5, 2016;212:121-7. (Year: 2016).*
Song J, Yang Y, Li X, Huang Z, Yang Y. Robust hashing with local models for approximate similarity search. IEEE transactions on cybernetics. Jan. 17, 2014;44(7):1225-36. (Year: 2014).*
Ye G, Liu D, Wang J, Chang SF. Large-scale video hashing via structure learning. InProceedings of the IEEE international conference on computer vision 2013 (pp. 2272-2279). (Year: 2013).*
Zhu H, Long M, Wang J, Cao Y. Deep hashing network for efficient similarity retrieval. InThirtieth AAAI Conference on Artificial Intelligence Mar. 2, 2016. (Year: 2016).*
U.S. Appl. No. 14/980,572, filed Dec. 28, 2015.
Ge, Tiezheng et al., "Optimized Product Quantization," IEEE Transactions on Pattern Analysis and Machine Intelligence, vol. 36, No. 4, pp. 744-755, Apr. 2014.
Gong, Yunchao et al., "Iterative Quantization: A Procrustean Approach to Learning Binary Codes for Large-Scale Image Retrieval," IEEE Transactions on Pattern Analysis and Machine Intelligence, vol. 35, No. 12, pp. 2916-2929, Dec. 2013.
He, Kaiming et al., "K-means Hashing: An Affinity-Preserving Quantization Method for Learning Binary Compact Codes," Proceedings of the 2013 IEEE Conference on Computer Vision and Pattern Recognition, pp. 2938-2945, Jun. 2013.
Jegou, Herve et al., "Product Quantization for Nearest Neighbor Search," IEEE Transactions on Pattern Analysis and Machine Intelligence, vol. 33, No. 1, pp. 117-128, Mar. 2010.
Liu, Wei et al., "Hashing with Graphs," Proceedings of the 28th International Conference on Machine Learning, pp. 1-8, Jun. 2011.
Liu, Wei et al., "Supervised Hashing with Kernels," Proceedings of the 2012 IEEE Conference on Computer Vision and Pattern Recognition, pp. 2074-2081, Jun. 2012.
Norouzi, Mohammad et al., "Cartesian K-means," Proceedings of the 2013 IEEE Conference on Computer Vision and Pattern Recognition, pp. 3017-3024, Jun. 2013.
Norouzi, Mohammad et al., "Minimal Loss Hashing for Compact Binary Codes," Proceedings of the 28th International Conference on Machine Learning, pp. 353-360, Jun. 2011.
Wang, Jun et al., "Semi-Supervised Hashing for Scalable Image Retrieval," Proceedings of the 2010 IEEE Conference on Computer Vision and Pattern Recognition, pp. 3424-3431, Jun. 2010.
Weiss, Yair et al., "Spectral Hashing," Advances in Neural Information Processing 21, Dec. 2008.

* cited by examiner

SYSTEMS AND METHODS FOR PROVIDING CONTENT

FIELD OF THE INVENTION

The present technology relates to the field of content provision. More particularly, the present technology relates to techniques for providing content to users.

BACKGROUND

Today, people often utilize computing devices (or systems) for a wide variety of purposes. Users can use their computing devices to, for example, interact with one another, access content, share content, and create content. Under conventional approaches, various techniques can be applied to store and retrieve content items. Such existing approaches, however, may suffer from various performance and/or accuracy issues. For example, conventional content retrieval systems typically rely on respective labels (or tags) that describe content items. These labels can be used to index the content items and also for retrieving content items that are responsive to queries.

SUMMARY

Various embodiments of the present disclosure can include systems, methods, and non-transitory computer readable media configured to receive a first content item having a set of frames. A binary hash code that represents the first content item is generated using at least an aggregation model and an iterative quantization hash model, the binary hash code being determined based at least in part on the set of frames of the first content item. The binary hash code is stored, wherein a similarity between the first content item and a second content item is capable of being measured based at least in part on a comparison of the binary hash code of the first content item and a binary hash code of the second content item.

In some embodiments, the systems, methods, and non-transitory computer readable media are configured to train the aggregation model using a set of training content items, the aggregation model being trained to transform the set of frames of the first content item to a fixed-length representation.

In some embodiments, the systems, methods, and non-transitory computer readable media are configured to determine respective high-level floating point vectors for each frame of each content item included in the set of training content items; transform the high-level floating point vectors to corresponding reduced-dimension floating point vectors, the reduced-dimension floating point vectors having fewer dimensions than the high-level floating point vectors; and cluster the reduced-dimension floating point vectors into a set of clusters.

In some embodiments, the systems, methods, and non-transitory computer readable media are configured to train the iterative quantization hash model using the set of training content items, the iterative quantization hash model being trained to transform the fixed-length representation of the first content item to the binary hash code.

In some embodiments, the systems, methods, and non-transitory computer readable media are configured to transform the set of frames of the first content item into a fixed-length feature representation using the aggregation model and transform the fixed-length feature representation to the binary hash code using the iterative quantization hash model.

In some embodiments, the systems, methods, and non-transitory computer readable media are configured to determine respective high-level floating point vectors for each frame in the set of frames corresponding to the first content item; transform the high-level floating point vectors to corresponding reduced-dimension floating point vectors, the reduced-dimension floating point vectors having fewer dimensions than the high-level floating point vectors; decompose the set of frames into a set of components; pool each component in the set of components; and concatenate each component in the set of components to produce the fixed-length feature representation.

In some embodiments, each frame corresponds to a component, and wherein each component is weighted based on a respective distance between the frame and a cluster center.

In some embodiments, an average pooling is applied to each of the components.

In some embodiments, the systems, methods, and non-transitory computer readable media are configured to quantize the fixed-length feature representation using the iterative quantization hash model to produce the binary hash code.

In some embodiments, a comparison of the binary hash code of the first content item and the binary hash code of the second content item is performed using one or more bitwise operations.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
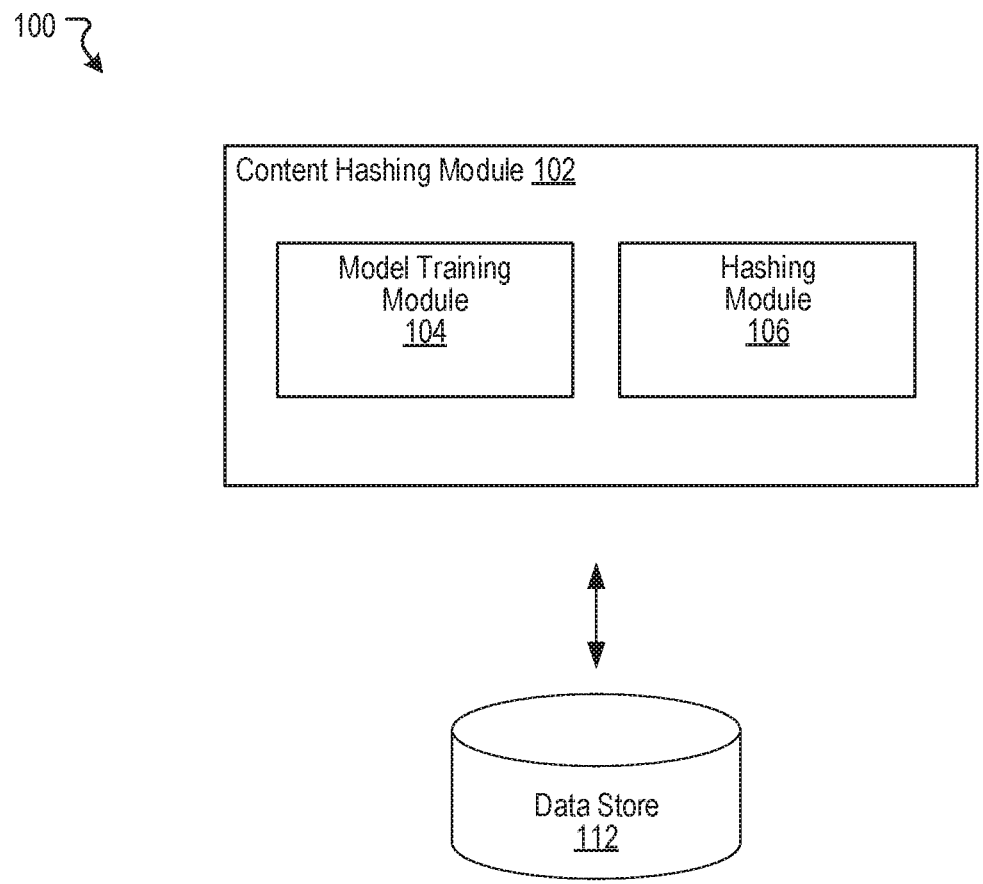
FIG. 1 illustrates an example system including an example content hashing module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Content

People often utilize computing devices (or systems) for a wide variety of purposes. Users can use their computing devices to, for example, interact with one another, access content, share content, and create content. Under conventional approaches, various techniques can be applied to store and retrieve content items. Such existing approaches, however, may suffer from various performance and/or accuracy issues. For example, conventional content retrieval systems typically rely on respective labels (or tags) that describe content items. These labels can be used to index the content items and also for retrieving content items that are responsive to queries. In some instances, conventional approaches may utilize frame hashing techniques to evaluate individual frames of videos. Such frame hashes may be used to identify similar content between content items. However, indexing and retrieving content using such individual frame hashes may also suffer from performance and/or accuracy issues. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, similarity-preserving binary hash codes can be generated for content items (e.g., videos) using the approaches described herein. In some embodiments, each binary hash code represents a content item in its entirety. That is, a binary hash code of a first content item and a binary hash code of a second content item can be compared to determine an amount of similarity between the first content item and the second content item. In some embodiments, such comparisons can be performed using bitwise operations. By utilizing compact binary hash codes, the space needed to store information describing content items can also be reduced significantly. Moreover, such binary hash codes allow comparisons to be made between content items much faster than conventional approaches.

FIG. 1 illustrates an example system 100 including an example content hashing module 102, according to an embodiment of the present disclosure. As shown in the example of FIG. 1, the content hashing module 102 can include a model training module 104 and a hashing module 106. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content hashing module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content hashing module 102 can be implemented, in part or in whole, as software running on one or more computing devices or systems, such as on a user or client computing device. In one example, the content hashing module 102 or at least a portion thereof can be implemented as or within an application (e.g., app), a program, or an applet, etc., running on a user computing device or a client computing system, such as the user device 710 of FIG. 7. In another example, the content hashing module 102 or at least a portion thereof can be implemented using one or more computing devices or systems that include one or more servers, such as network servers or cloud servers. In some instances, the content hashing module 102 can, in part or in whole, be implemented within or configured to operate in conjunction with a social networking system (or service), such as the social networking system 730 of FIG. 7.

The content hashing module 102 can be configured to communicate and/or operate with the at least one data store 112, as shown in the example system 100. The at least one data store 112 can be configured to store and maintain various types of data. For example, the data store 112 can store information describing various content items (e.g., GIF images, videos, etc.) that have been posted by users of a social networking system. In some implementations, the at least one data store 112 can store information associated with the social networking system (e.g., the social networking system 730 of FIG. 7). The information associated with the social networking system can include data corresponding to content items, users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

In some embodiments, the model training module 104 can be configured to train a model for generating similarity-preserving binary hash codes for various content items. More details regarding the model training module 104 will be provided below in reference to FIG. 2.

In some embodiments, the hashing module 106 can be configured to generate similarity-preserving binary hash codes for content items using the model trained by the model training module 104. More details regarding the hashing module 106 will be provided below in reference to FIG. 3.

Figure 2:
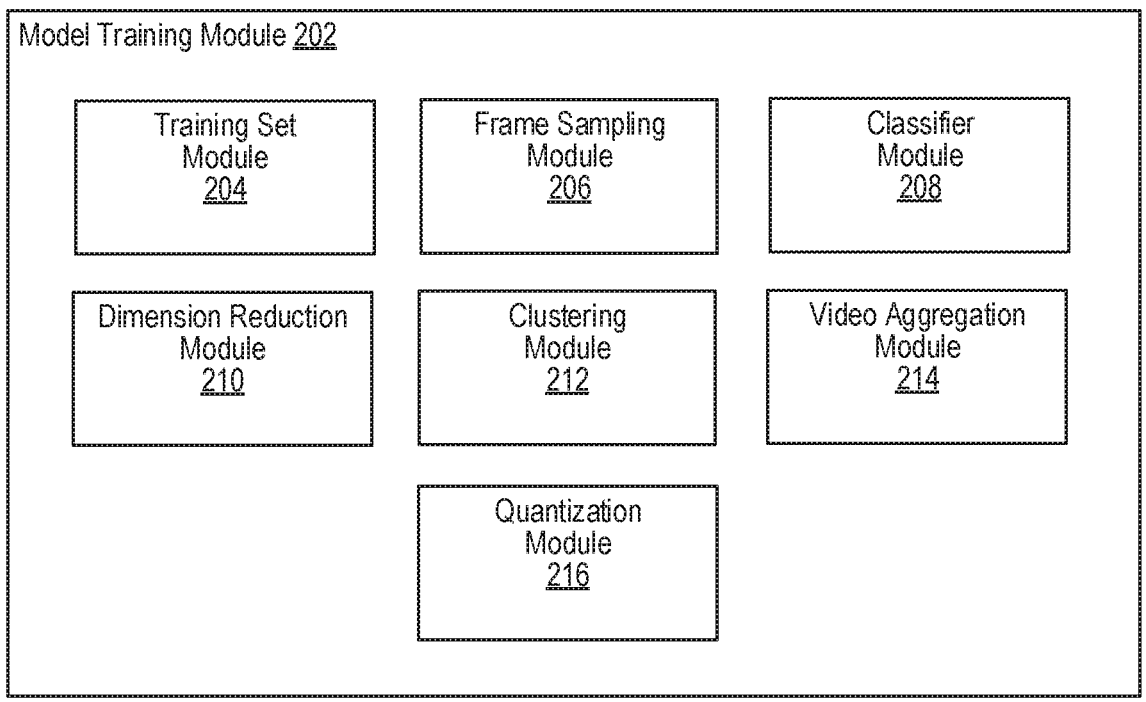
FIG. 2 illustrates an example model training module, according to an embodiment of the present disclosure.

FIG. 2 illustrates a model training module 202, according to an embodiment of the present disclosure. In some embodiments, the model training module 104 of FIG. 1 can be implemented with the model training module 202. As shown in the example of FIG. 2, the model training module 202 can include a training set module 204, a frame sampling module 206, a classifier module 208, a dimension reduction module 210, a clustering module 212, a video aggregation module 214, and a quantization module 216.

In some embodiments, the training set module 204 can be configured to obtain a set of videos. These videos can be used to train a model for generating respective binary hash codes for various content items. In general, each of these videos may include any number of frames and have any arbitrary duration. In various embodiments, the approaches described herein can be adapted to process any sequence (or group) of images including, for example, videos and images formatted in the Graphics Interchange Format (GIF).

In some embodiments, the frame sampling module 206 can be configured to extract frames from videos. For example, the frame sampling module 206 can extract each frame from each video included in the set of training videos.

In some embodiments, the frame sampling module 206 performs the frame extraction using a video decoder implemented using generally known techniques. In some embodiments, the frame sampling module 206 is configured to perform uniform sampling at some rate (e.g., one frame per second). In such embodiments, the frame sampling module 206 can output a set of images that each correspond to a frame of a given video based on the uniform sampling rate.

In some embodiments, the classifier module 208 can be configured to obtain respective semantic feature representations for video frames. For example, the classifier module 208 can generate a high-dimensional floating point vector for each frame of a video by analyzing the subject matter of the frame using a trained machine learning model (content classifier). In some embodiments, the respective high-dimensional floating point vectors corresponding to the frames are each 2,048 dimensions. The content classifier can be based on any machine learning technique, including but not limited to a deep convolutional neural network. The deep convolutional neural network can include a set of layers including, for example, one or more convolutional layers, one or more fully connected layers, and a semantic layer that outputs respective semantic feature representations for inputted frames. In various embodiments, the content classifier supported by the classifier module 208 can be trained and tested to determine semantic feature representations for inputted frames. Once trained, the content classifier can be applied to a new frame to determine a high-dimensional floating point vector that describes the new frame.

In some embodiments, the dimension reduction module 210 can be configured to reduce the number of dimensions for each of the frames of the training videos. In some embodiments, the dimension reduction is achieved using a principal component analysis (PCA) model using one or more projections. In some embodiments, the dimension reduction module 210 reduces the respective high-dimensional floating point vectors for each of the frames into a respective set of reduced dimensions. In some embodiments, when reducing a high-dimensional floating point vector to a set of reduced dimensions, the dimension reduction module 210 can also utilize a set of directions (e.g., principal directions having the largest variances) that each correspond to a reduced dimension. The number of dimensions used to represent the frames can vary depending on the implementation. For example, in some embodiments, each high-dimensional floating point vector is reduced from 2,048 dimensions to 256 dimensions.

In some embodiments, the clustering module 212 is configured to cluster the reduced-dimension floating point vectors of frames corresponding to the set of training videos into a set of clusters. The number of clusters generated can vary depending on the implementation. In some embodiments, the clustering module 212 implements any generally known unsupervised clustering technique. In one example, the clustering module 212 can implement k-means clustering. In this example, the value of k can vary based on the implementation (e.g., k=10, k=15, k=20, etc.).

In some embodiments, the video aggregation module 214 implements a video aggregation model that transforms a set of frames corresponding to a video to a fixed-length feature representation. In such embodiments, the video aggregation model is trained using reduced-dimension floating point vectors produced by the dimension reduction module 210 and the clusters (e.g., cluster centers) generated by the clustering module 212. In some embodiments, the fixed-length feature representation is generated by the video aggregation module 214 based on the respective original feature representations for the set of frames that were determined by the classifier module 208 and also information describing the clustered reduced-dimension floating point vectors (e.g., cluster centers) that were produced using the dimension reduction module 210 and the clustering module 212.

In some embodiments, the quantization module 216 is configured to train an iterative quantization (ITQ) hash model to be used for transforming the fixed-length feature representations generated by the video aggregation module 214 into respective compact binary hash codes. Some example approaches for implementing an ITQ hash model are described in U.S. application Ser. No. 14/980,572, filed on Dec. 28, 2015, and entitled "Systems and Methods for Online Clustering of Content Items," spectral hashing (Y. Weiss, A. Torralba, and R. Fergus "Spectral Hashing," *Neural Information Processing Systems* (NIPS), 2008), iterative quantization (Y. Gong, S. Lazebnik, A. Gordo, and F. Perronnin "Iterative quantization: A Procrustean approach to learning binary hash codes for large-scale image retrieval," *Pattern Analysis and Machine Intelligence* (*PAMI*), 2012), minimal loss hashing (M. Norouzi and D. J. Fleet "Minimal loss hashing for compact binary hash codes," *International Conference on Machine Learning* (*ICML*), 2011), graph hashing (W. Liu, S. Kumar, and S.-F. Chang "Hashing with graphs," *International Conference on Machine Learning* (*ICML*), 2011 and W. Liu, J. Wang, R. Ji. Y.-G. Jiang, and S.-F. Chang "Supervised hashing with kernels," *Computer Vision and Pattern Recognition* (*CVPR*), 2012), semi-supervised hashing (J. Wang, S. Kumar, and S.-F. Chang "Semi-supervised hashing for scalable image retrieval," *Computer Vision and Pattern Recognition* (*CVPR*), 2010), product quantization (H. Jegou, M. Douze, and C. Schmid "Product quantization for nearest neighbor search," *IEEE Transactions on Pattern Analysis and Machine Intelligence* (*IEEE TPAMI*), 2011), optimized product quantization (T. Ge, K. He, Q. Ke, and J. Sun "Optimized product quantization," *Pattern Analysis and Machine Intelligence* (*PAMI*), 2014), k-means hashing (K. He, F. Wen, and J. Sun "K-means hashing: an affinity-preserving quantization method for learning binary compact codes," *Computer Vision and Pattern Recognition* (*CVPR*), 2013), and Cartesian k-means (M. Norouzi and D. Fleet "Cartesian kmeans," *Computer Vision and Pattern Recognition* (*CVPR*), 2013), all of which are incorporated herein by reference.

Figure 3:
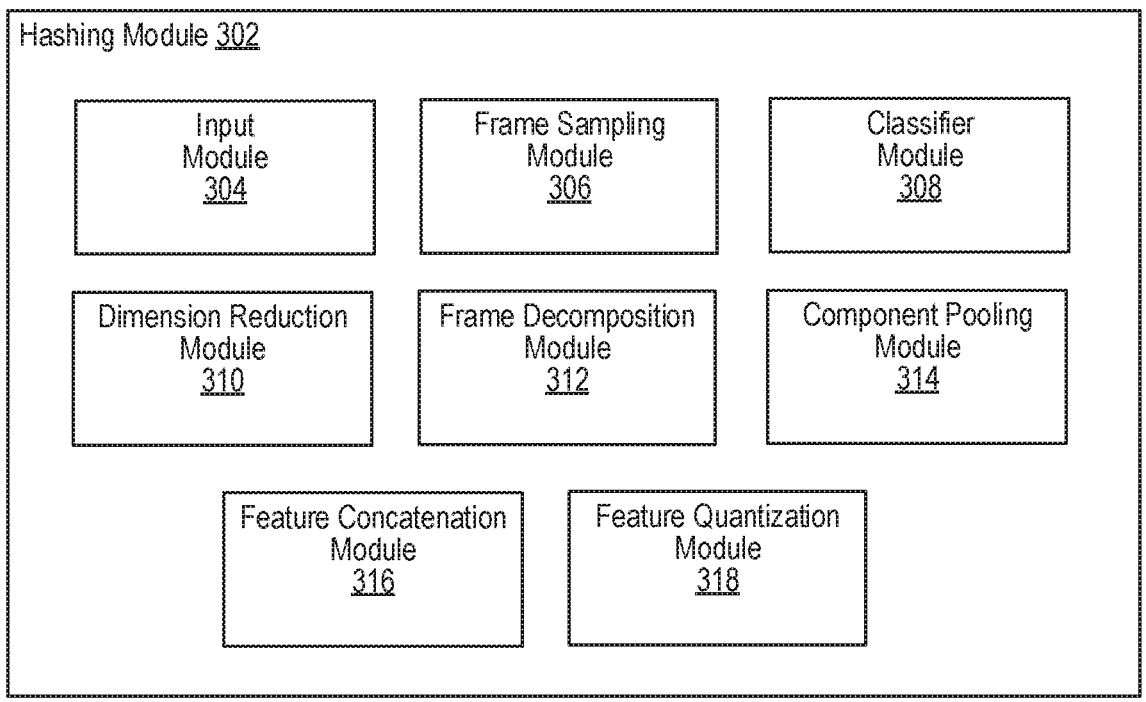
FIG. 3 illustrates an example hashing module, according to an embodiment of the present disclosure.

In various embodiments, the video aggregation model and the ITQ hash model are incorporated into a video hash model that is used to generate binary hash codes for content items, as described in reference to FIG. 3.

FIG. 3 illustrates a hashing module 302, according to an embodiment of the present disclosure. In some embodiments, the hashing module 106 of FIG. 1 can be implemented with the hashing module 302. As shown in the example of FIG. 3, the hashing module 302 can include an input module 304, a frame sampling module 306, a classifier module 308, a dimension reduction module 310, a frame decomposition module 312, a component pooling module 314, a feature concatenation module 316, and a feature quantization module 318.

In various embodiments, the input module 304 is configured to receive (or obtain) content items (e.g., videos) for which binary hash codes are to be generated. For example, a user of a content provider (e.g., social networking system) may upload a video to be published through the content provider. In this example, the content provider can automatically generate a binary hash code for the video. The binary hash code can be indexed and used to perform similarity searches between the video and other content items. For example, the binary hash code can be hashed to a bucket in an index. Any binary hash codes corresponding to other content items can that were hashed to the same bucket can be determined. In some embodiments, the similarity between the video and another content item can be determined by performing a bitwise operation between the binary hash code of the video and the binary hash code of the content item.

In some embodiments, the frame sampling module 306 can be configured to extract frames from received the content item. For example, in some embodiments, the frame sampling module 306 performs the frame extraction using a video decoder implemented using generally known techniques. In some embodiments, the frame sampling module 306 is configured to perform uniform sampling at some rate (e.g., one frame per second). In such embodiments, the frame sampling module 306 can output a set of images that each correspond to a frame for the content item based on the uniform sampling rate.

In some embodiments, the classifier module 308 can be configured to obtain respective semantic feature representations for frames of the content item using the trained content classifier, as described above. For example, the classifier module 308 can determine a respective high-dimensional floating point vector for each of the frames in the content item.

In various embodiments, the video aggregation model described above can be used to transform the frames corresponding to the content item into a fixed-length feature representation. The operations performed by the video aggregation model are described in reference to the dimension reduction module 310, the frame decomposition module 312, the component pooling module 314, and the feature concatenation module 316.

In some embodiments, the dimension reduction module 310 can be configured to reduce the number of dimensions for each of the frames of the content item, as described above. For example, in some embodiments, the dimension reduction module 310 reduces each high-dimensional floating point vector for each of the frames in the content item to a corresponding reduced set of dimensions (e.g., 256 dimensions).

In some embodiments, the frame decomposition module 312 can be configured to measure the respective distances between each frame in the content item and the center of each cluster that was generated by the clustering module 212, as described above. The frame decomposition module 312 can assign a respective weight based on the distance between a frame and a cluster center. Thus, in some embodiments, a weight is applied for each cluster that was generated by the clustering module 212. Each frame can be decomposed into a set of components based on the respective weights assigned to the frame. Such decomposition of frames can be used to determine what portions of the content item correspond to some topic or concept as represented by the different clusters. One example formula for performing frame decomposition is as follows:

$$x_t \rightarrow [p_t^1 x_t, p_t^2 x_t, \ldots, p_t^k x_t],$$

where $p_t^k$ corresponds to a pooling weight corresponding to cluster k and where $x_t$ corresponds to a frame t in a content item x.

One example formula for determining a pool weight is as follows:

$$p_t^k \propto \frac{1}{\|x_t - C_k\|^3},$$

where $p_t^k$ corresponds to a pooling weight corresponding to cluster k, where $x_t$ corresponds to a frame t in a content item x, and where $C_k$ corresponds to a center for cluster k.

In some embodiments, the component pooling module 314 is configured to perform a pooling (e.g., average pooling) for each component corresponding to each frame in the content item. In some embodiments, a component corresponds to a cluster center that was generated by the clustering module 212 of FIG. 2. Thus, for example, if the frames of the content item were clustered into 10 clusters, the component pooling module 314 can perform an average pooling of frames included in each of the 10 clusters to produce 10 components (e.g., feature vectors). Naturally, the number of frames included in a given cluster will vary depending on the content represented in the frames and their respective similarity to one another.

In some embodiments, the feature concatenation module 316 is configured to combine (or concatenate) each of the components for the frames of the content item. This concatenation is used to generate the fixed-length feature representation for the content item.

In some embodiments, the feature quantization module 318 is configured to produce a binary hash code for the content item. For example, the feature quantization module 318 can generate the binary hash code using the ITQ hash model that was trained by the quantization module 216 of FIG. 2. In such embodiments, the binary hash code is generated based on a concatenation of the components of the content item. As a result, in some embodiments, the binary hash code is representative of the content item in its entirety. In some embodiments, such binary hash codes can be used to identify matching content items. In some embodiments, the approaches described above can be adapted to generate respective binary hash codes that correspond to different clips in a content item. For example, a video may include a first clip that corresponds to a first movie trailer and a second clip that corresponds to a second movie trailer. In this example, a first binary hash code can be generated for the first clip and a second binary hash code can be generated for the second clip.

Figure 4:
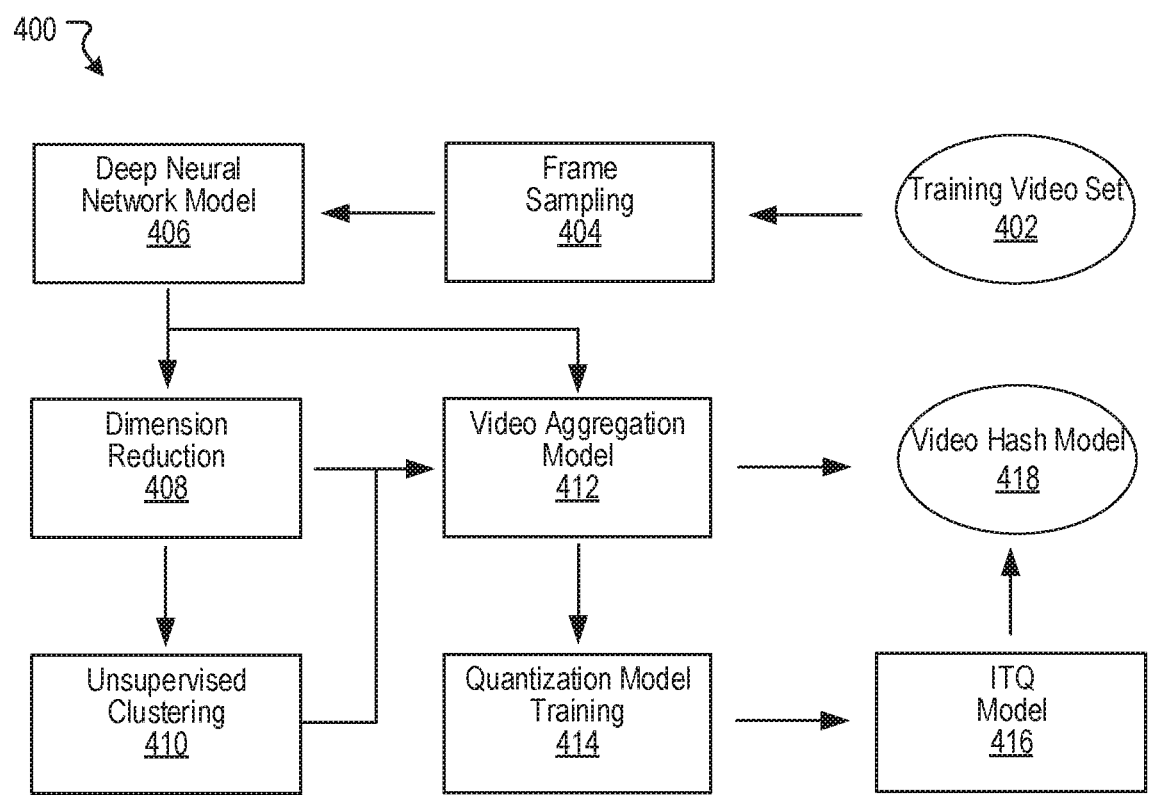
FIG. 4 illustrates an example diagram of a pipeline for training a content hashing model, according to an embodiment of the present disclosure.

FIG. 4 illustrates an example diagram of a pipeline 400 for training a content hashing model, according to an embodiment of the present disclosure. In the example of FIG. 4, a set of videos for training the model are obtained 402. The frames of each video in the set are sampled 404. For example, each frame of each video in the set is extracted using a video decoder implemented using generally known techniques. In some embodiments, the frames are sampled at some pre-defined rate (e.g., one frame per second). The sampled frames are provided to a content classifier (e.g., deep neural network model) that is configured to obtain respective semantic feature representations for each of the frames 406. The dimensionality of these semantic feature representations (e.g., high-dimensional floating point vectors) for each of the frames is reduced 408. For example, in some embodiments, each high-dimensional floating point vector is reduced from 2,048 dimensions to 256 dimensions. The reduced-dimension floating point vectors of the frames are then clustered 410. For example, the reduced-dimension floating point vectors can be clustered using k-means clustering. In this example, the value of k can vary based on the implementation (e.g., k=10, k=15, k=20, etc.). Next, the frames of a given video can be transformed into a fixed-length representation using a video aggregation model 412. This transformation into the fixed-length representation can be achieved using the respective original feature representations for the set of frames 406 and also information describing the clustered reduced-dimension floating point vectors (e.g., cluster centers) that were produced after the dimensionality reduction 408 and clustering 410. An iterative quantization (ITQ) hash model can be trained to transform fixed-length feature representations into respective binary hash codes 414. The video aggregation model 412 and the ITQ hash model 416 can be incorporated into a video hash model 418 that can be used to generate binary hash codes for content items, as described in reference to FIG. 5.

Figure 5:
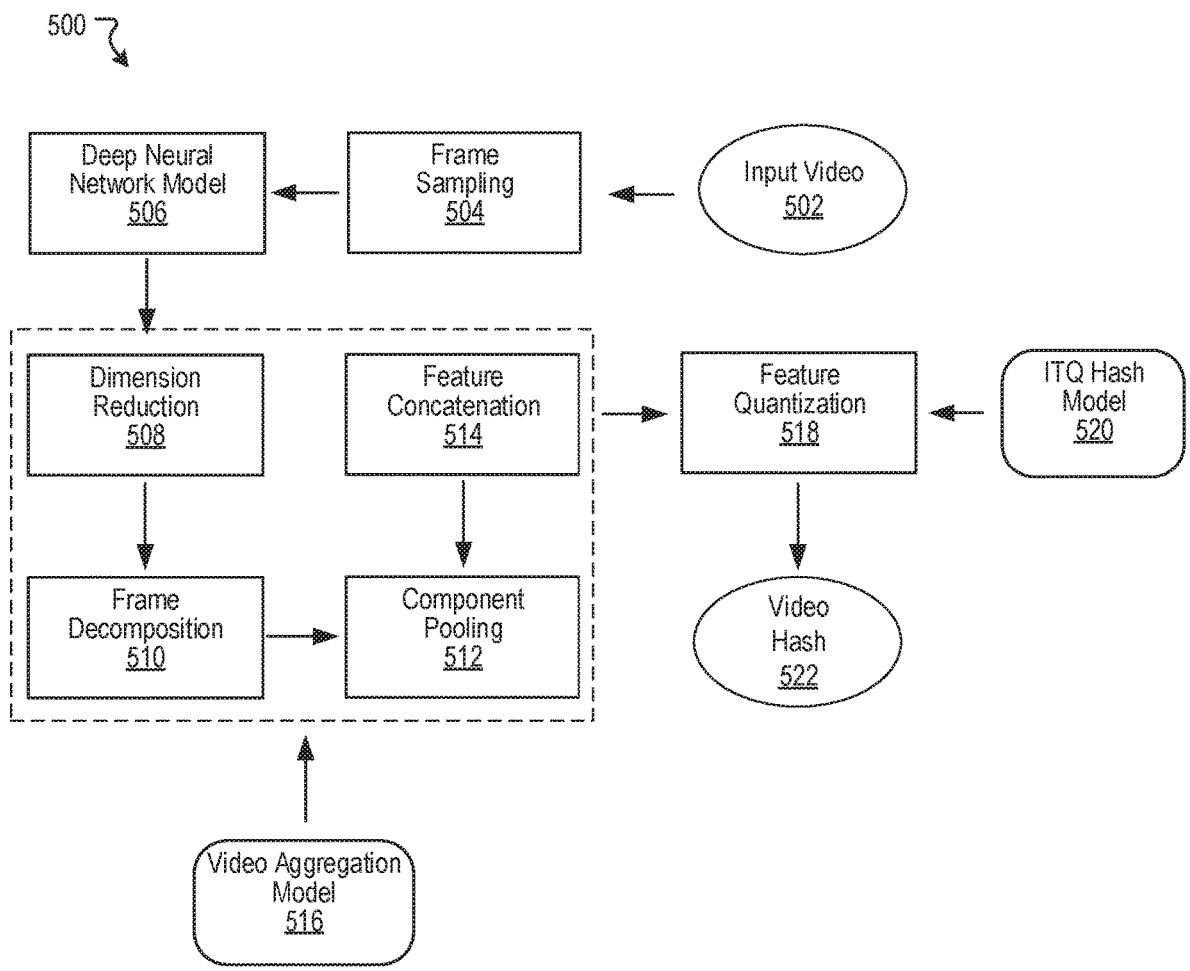
FIG. 5 illustrates an example diagram of a pipeline for generating binary hash codes, according to an embodiment of the present disclosure.

FIG. 5 illustrates an example diagram of a pipeline 500 for generating binary hash codes, according to an embodiment of the present disclosure. In the example of FIG. 5, a content item (e.g., video) for which a binary hash code is to be generated is obtained 502. In one example, the content item may have been uploaded by a user of a content provider (e.g., social networking system). In this example, the content provider can automatically generate the binary hash code for the content item. Next, each of the frames of the content item are sampled 504 as described above. Once sampled, a set of images that each correspond to a frame of the content item are provided to a content classifier (e.g., deep neural network model) for processing 506. The content classifier can obtain a respective semantic feature representation (e.g., high-dimensional floating point vector) for each of the frames of the content item as described above. The dimensionality of these semantic feature representations (e.g., high-dimensional floating point vectors) for each of the frames is reduced 508. For example, in some embodiments, each high-dimensional floating point vector is reduced from 2,048 dimensions to 256 dimensions. A respective distance between each frame of the content item and the center of each cluster that was generated by the clustering module 212 is determined 510. A respective weight is assigned based on the respective distance between a frame and a cluster center. Thus, in some embodiments, a weight is applied for each cluster that was generated by the clustering module 212. Each frame can be decomposed into a set of components based on the respective weights assigned to the frame as described above. In some embodiments, a pooling (e.g., average pooling) is applied to each component in the set of components 512. These components can then be combined (e.g., concatenated) 514. The concatenated components can be used to generate a fixed-length feature representation for the content item using the video aggregation model 516. Next, the trained ITQ hash model 520 is used to quantize the fixed-length feature representation 518 to produce the binary hash code for the content item 522.

Figure 6:
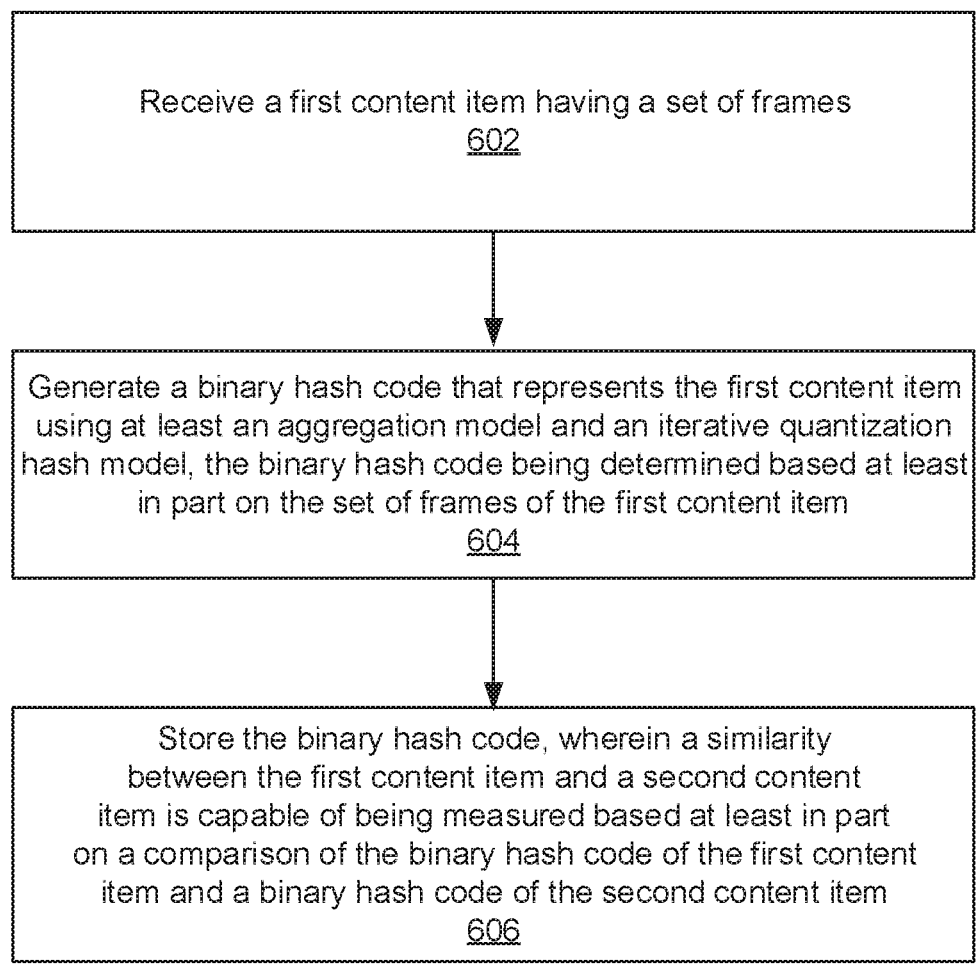
FIG. 6 illustrates an example method, according to an embodiment of the present disclosure.

FIG. 6 illustrates an example method 600, according to an embodiment of the present disclosure. It should be appreciated that there can be additional, fewer, or alternative steps performed in similar or alternative orders, or in parallel, within the scope of the various embodiments discussed herein unless otherwise stated.

At block 602, a first content item having a set of frames is received. At block 604, a binary hash code that represents the first content item is generated using at least an aggregation model and an iterative quantization hash model. The binary hash code is determined based at least in part on the set of frames of the first content item. At block 606, the binary hash code is stored. A similarity between the first content item and a second content item is capable of being measured based at least in part on a comparison of the binary hash code of the first content item and a binary hash code of the second content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
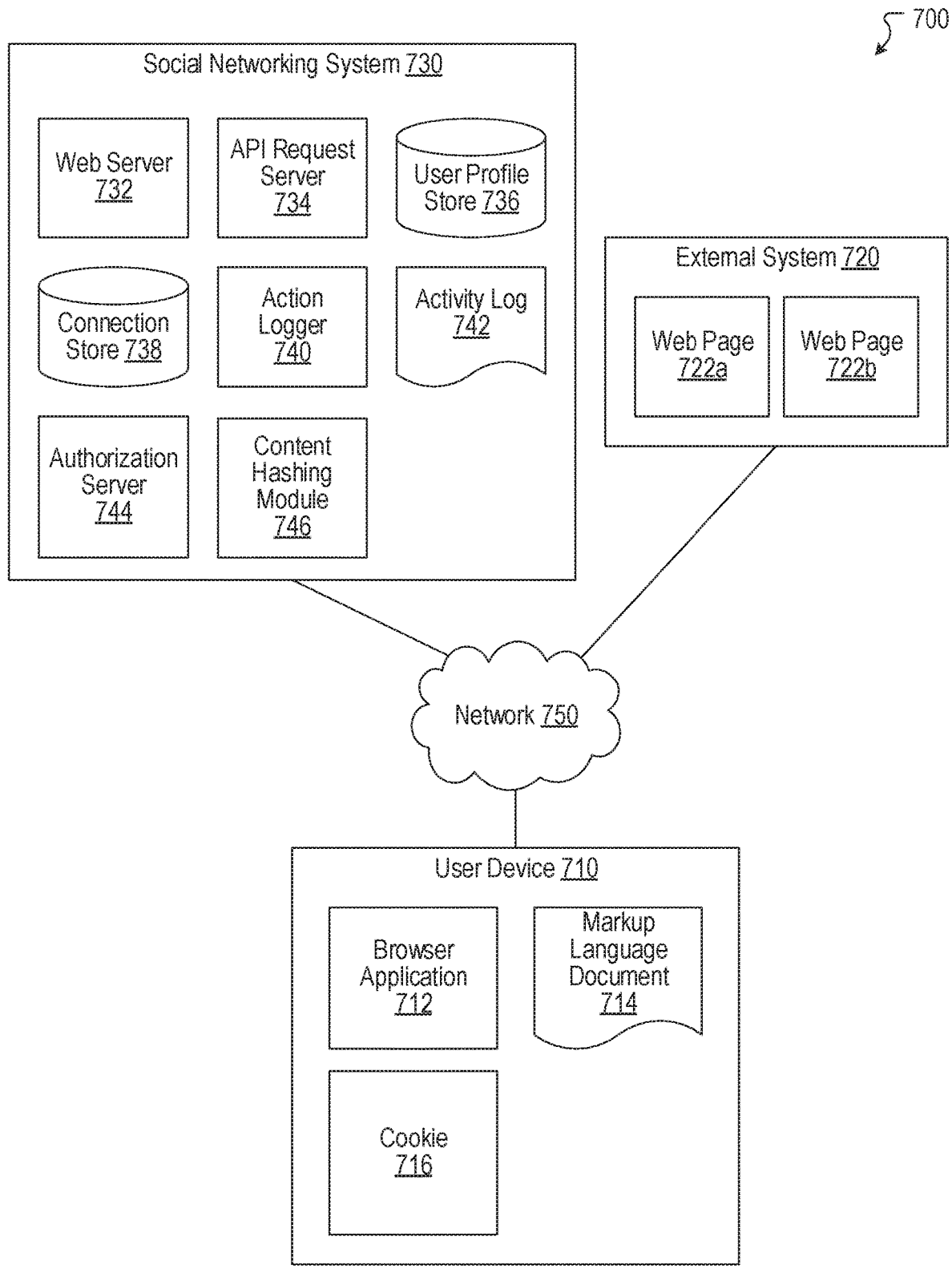
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content hashing module 746. The content hashing module 746 can, for example, be implemented as the content hashing module 102 of FIG. 1. As discussed previously, it should be appreciated that there can be many variations or other possibilities.

Hardware Implementation

Figure 8:
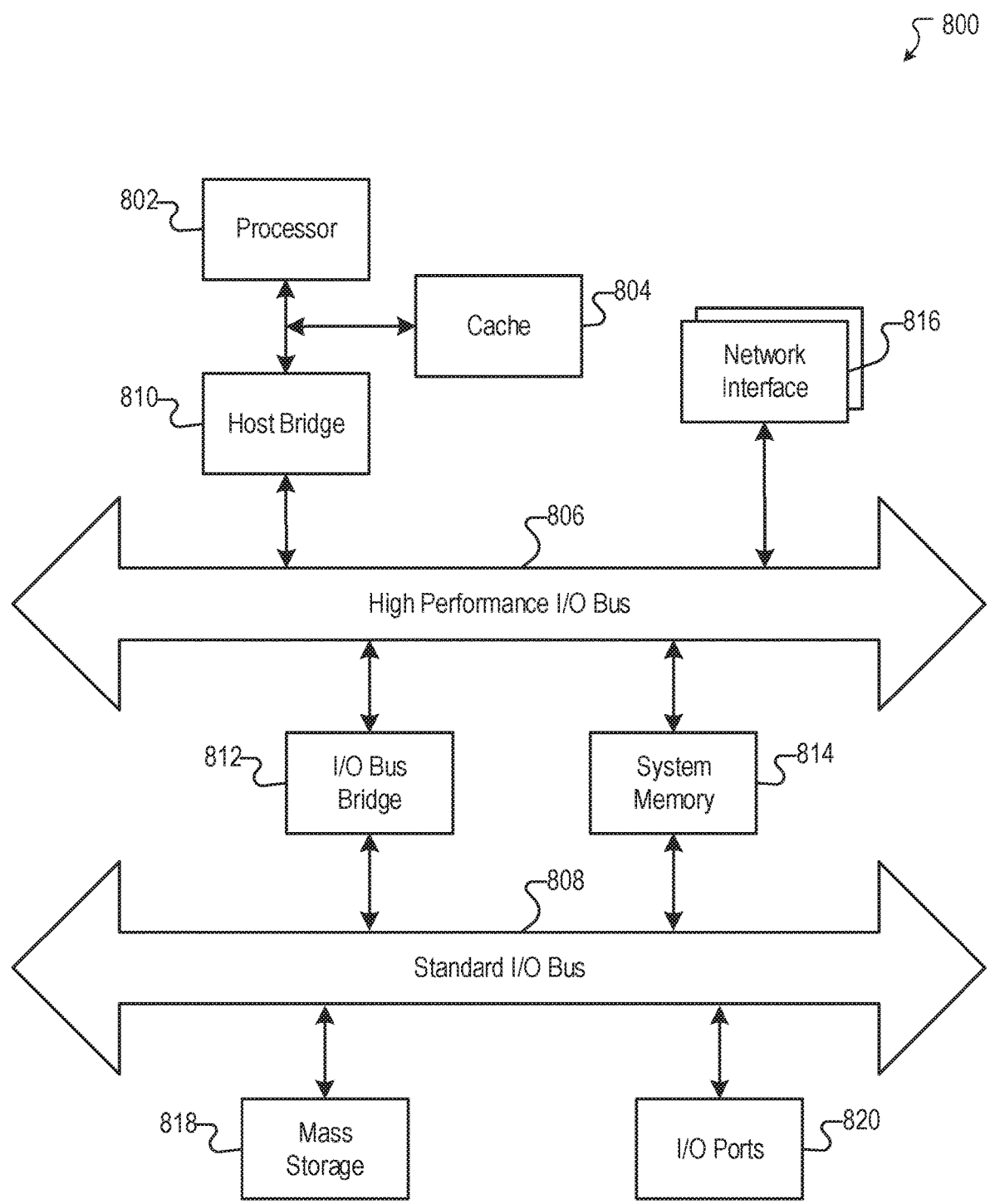
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a first content item having a set of frames;
   generating, by the computing system, a binary hash code that represents the first content item using at least an aggregation model and an iterative quantization hash model, the binary hash code being determined based at least in part on the set of frames of the first content item, the generating further comprising:
   transforming, by the computing system, the set of frames of the first content item into a fixed-length feature representation using the aggregation model, the transforming further comprising:
   assigning, by the computing system, at least one frame in the set of frames associated with the first content item at least a first weight based on a distance between the at least one frame and a center of a first cluster in a plurality of clusters of reduced-dimension floating point vectors associated with a plurality of frames from a set of training content items and a second weight based on a distance between the at least one frame and a center of a second cluster in the plurality of clusters;
   decomposing, by the computing system, the at least one frame into a set of components based at least in part on the first weight and the second weight, wherein the set of components relate one or more portions of the first content item with one or more respective topics; and
   storing, by the computing system, the binary hash code of the first content item;
   determining, by the computing system, a similarity between the first content item and a second content item, wherein the similarity is measured based at least in part on a comparison of the binary hash code of the first content item and a binary hash code of the second content item.

2. The computer-implemented method of claim 1, the method further comprising:
   training, by the computing system, the aggregation model using a set of training content items, the aggregation model being trained to transform the set of frames of the first content item to a fixed-length representation.

3. The computer-implemented method of claim 2, wherein training the aggregation model further comprises:
   determining, by the computing system, respective high-level floating point vectors for each frame of each content item included in the set of training content items;
   transforming, by the computing system, the high-level floating point vectors to corresponding reduced-dimension floating point vectors, the reduced-dimension floating point vectors having fewer dimensions than the high-level floating point vectors; and
   clustering, by the computing system, the reduced-dimension floating point vectors into a set of clusters.

4. The computer-implemented method of claim 2, the method further comprising:

training, by the computing system, the iterative quantization hash model using the set of training content items, the iterative quantization hash model being trained to transform the fixed-length representation of the first content item to the binary hash code.

5. The computer-implemented method of claim 1, wherein generating the binary hash code that represents the first content item further comprises:
   transforming, by the computing system, the fixed-length feature representation to the binary hash code using the iterative quantization hash model.

6. The computer-implemented method of claim 5, wherein transforming the set of frames of the first content item into the fixed-length feature representation using the aggregation model further comprises:
   determining, by the computing system, respective high-level floating point vectors for each frame in the set of frames corresponding to the first content item;
   transforming, by the computing system, the high-level floating point vectors to corresponding reduced-dimension floating point vectors, the reduced-dimension floating point vectors having fewer dimensions than the high-level floating point vectors;
   pooling, by the computing system, each component in the set of components; and
   concatenating, by the computing system, each component in the set of components to produce the fixed-length feature representation.

7. The computer-implemented method of claim 6, wherein each
   frame corresponds to a component, and wherein each component is weighted based on a respective distance between the frame and a cluster center.

8. The computer-implemented method of claim 6, wherein an average pooling is applied to each of the components.

9. The computer-implemented method of claim 5, wherein transforming the fixed-length feature representation to the binary hash code using the iterative quantization hash model further comprises:
   quantizing, by the computing system, the fixed-length feature representation using the iterative quantization hash model to produce the binary hash code.

10. The computer-implemented method of claim 1, wherein comparison of the binary hash code of the first content item and the binary hash code of the second content item is performed using one or more bitwise operations.

11. A system comprising:
    at least one processor; and
    a memory storing instructions that, when executed by the at least one processor, cause the system to perform:
    receiving a first content item having a set of frames;
    generating a binary hash code that represents the first content item using at least an aggregation model and an iterative quantization hash model, the binary hash code being determined based at least in part on the set of frames of the first content item, the generating further comprising:
    transforming the set of frames of the first content item into a fixed-length feature representation using the aggregation model, the transforming further comprising:
    assigning at least one frame in the set of frames associated with the first content item at least a first weight based on a distance between the at least one frame and a center of a first cluster in a plurality of clusters of reduced-dimension floating point vectors associated with a plurality of frames from a set of training content items and a second weight based on a distance between the at least one frame and a center of a second cluster in the plurality of clusters;
    decomposing, by the computing system, the at least one frame into a set of components based at least in part on the first weight and the second weight, wherein the set of components relate one or more portions of the first content item with one or more respective topics; and
    storing the binary hash code of the first content item;
    determining a similarity between the first content item and a second content item, wherein the similarity is measured based at least in part on a comparison of the binary hash code of the first content item and a binary hash code of the second content item.

12. The system of claim 11, wherein the instructions further cause the system to perform:
    training the aggregation model using a set of training content items, the aggregation model being trained to transform the set of frames of the first content item to a fixed-length representation.

13. The system of claim 12, wherein training the aggregation model further causes the system to perform:
    determining respective high-level floating point vectors for each frame of each content item included in the set of training content items;
    transforming the high-level floating point vectors to corresponding reduced-dimension floating point vectors, the reduced-dimension floating point vectors having fewer dimensions than the high-level floating point vectors; and
    clustering the reduced-dimension floating point vectors into a set of clusters.

14. The system of claim 12, wherein generating the binary hash code that represents the first content item further causes the system to perform:
    training the iterative quantization hash model using the set of training content items, the iterative quantization hash model being trained to transform the fixed-length representation of the first content item to the binary hash code.

15. The system of claim 11, wherein generating the binary hash code that represents the first content item further causes the system to perform:
    transforming the fixed-length feature representation to the binary hash code using the iterative quantization hash model.

16. A non-transitory computer-readable storage medium including instructions that, when executed by at least one processor of a computing system, cause the computing system to perform a method comprising:
    receiving a first content item having a set of frames;
    generating a binary hash code that represents the first content item using at least an aggregation model and an iterative quantization hash model, the binary hash code being determined based at least in part on the set of frames of the first content item, the generating further comprising:
    transforming the set of frames of the first content item into a fixed-length feature representation using the aggregation model, the transforming further comprising:
    assigning at least one frame in the set of frames associated with the first content item at least a first weight based on a distance between the at least one frame and a center of a first cluster in a plurality of clusters of reduced-dimension floating point vectors associated with a plurality of frames from a set of training content items and a second weight based on a distance between the at least one frame and a center of a second cluster in the plurality of clusters;

decomposing, by the computing system, the at least one frame into a set of components based at least in part on the first weight and the second weight, wherein the set of components relate one or more portions of the first content item with one or more respective topics; and storing the binary hash code of the first content item;

determining a similarity between the first content item and a second content item, wherein the similarity is measured based at least in part on a comparison of the binary hash code of the first content item and a binary hash code of the second content item.

17. The non-transitory computer-readable storage medium of claim 16, wherein the instructions further cause the computing system to perform:

training the aggregation model using a set of training content items, the aggregation model being trained to transform the set of frames of the first content item to a fixed-length representation.

18. The non-transitory computer-readable storage medium of claim 17, wherein training the aggregation model further causes the computing system to perform:

determining respective high-level floating point vectors for each frame of each content item included in the set of training content items;

transforming the high-level floating point vectors to corresponding reduced-dimension floating point vectors, the reduced-dimension floating point vectors having fewer dimensions than the high-level floating point vectors; and clustering the reduced-dimension floating point vectors into a set of clusters.

19. The non-transitory computer-readable storage medium of claim 17, wherein generating the binary hash code that represents the first content item further causes the computing system to perform:

training the iterative quantization hash model using the set of training content items, the iterative quantization hash model being trained to transform the fixed-length representation of the first content item to the binary hash code.

20. The non-transitory computer-readable storage medium of claim 16, wherein generating the binary hash code that represents the first content item further causes the computing system to perform:

transforming the fixed-length feature representation to the binary hash code using the iterative quantization hash model.

* * * * *